United States Patent
Miyake et al.

(10) Patent No.: US 11,800,230 B2
(45) Date of Patent: Oct. 24, 2023

(54) IMAGE PROCESSING APPARATUS OF REDUCING WHOLE OPERATION TIME OF ARRIVAL INSPECTION, IMAGE PROCESSING METHOD, AND STORAGE MEDIUM

(71) Applicant: CANON KABUSHIKI KAISHA, Tokyo (JP)

(72) Inventors: Yuuya Miyake, Kanagawa (JP); Genki Cho, Kanagawa (JP); Hiroto Oka, Tokyo (JP); Shunsuke Noami, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/743,280

(22) Filed: May 12, 2022

(65) Prior Publication Data
US 2022/0377241 A1    Nov. 24, 2022

(30) Foreign Application Priority Data
May 19, 2021 (JP) ................. 2021-084732

(51) Int. Cl.
*H04N 23/69* (2023.01)
*G06K 7/14* (2006.01)
(Continued)

(52) U.S. Cl.
CPC ........... *H04N 23/69* (2023.01); *G06K 7/1413* (2013.01); *H04N 23/66* (2023.01); *H04N 23/695* (2023.01); *H04N 23/815* (2023.01)

(58) Field of Classification Search
CPC ...... H04N 23/69; H04N 23/66; H04N 23/695; H04N 23/815; G06K 7/1413; G06K 7/10811; G06K 7/10831; G06K 7/1443
See application file for complete search history.

(56) References Cited

U.S. PATENT DOCUMENTS 10,643,038 B1 *  5/2020  McCalib, Jr. ...... G06K 7/10356
10,984,207 B2 *  4/2021  Sone ................ G06K 19/06037
(Continued)

FOREIGN PATENT DOCUMENTS

JP    2011-150460 A    8/2011
JP    2019-220829 A    12/2019

*Primary Examiner* — Chiawei Chen
(74) *Attorney, Agent, or Firm* — Canon U.S.A., Inc., IP Division

(57) ABSTRACT

An image processing apparatus communicates an image capture device having panning, tilting, and zooming function. A code area is detected by performing a matching process on a whole object image area acquired by photographing an area including a whole predetermined object on which codes are attached, by an image capture device. Grouped areas are generated by grouping detected code areas, based on an angle of view to be set when performing photographing with zooming. The image capture device performs panning, tilting, and zooming operations, such that the generated grouped areas are sequentially photographed at a zoom magnification setting value. An image processing area set with respect to a group image obtained by performing the panning, tilting, and zooming operations and photographing each of the generated grouped area. Information on each code area included in the set image processing area is read.

15 Claims, 17 Drawing Sheets

(51) Int. Cl.
*H04N 23/695* (2023.01)
*H04N 23/80* (2023.01)
*H04N 23/66* (2023.01)

(56) References Cited

U.S. PATENT DOCUMENTS

| | | | |
|---|---|---|---|
| 11,012,606 B1* | 5/2021 | Bogacz | H04N 23/63 |
| 2002/0024598 A1* | 2/2002 | Kunimitsu | H04N 7/181 |
| | | | 348/E7.086 |
| 2012/0057022 A1* | 3/2012 | Nechiporenko | G06V 10/147 |
| | | | 348/135 |
| 2012/0274784 A1* | 11/2012 | Hofman | G06V 20/52 |
| | | | 348/169 |
| 2013/0096735 A1* | 4/2013 | Byford | G05D 1/0231 |
| | | | 701/28 |
| 2015/0193761 A1* | 7/2015 | Svetal | G06Q 20/208 |
| | | | 705/23 |
| 2017/0372159 A1* | 12/2017 | Schimmel | G06V 10/25 |
| 2020/0117873 A1* | 4/2020 | Sone | G06K 7/10871 |
| 2021/0158525 A1* | 5/2021 | Iwase | G06T 5/002 |

* cited by examiner

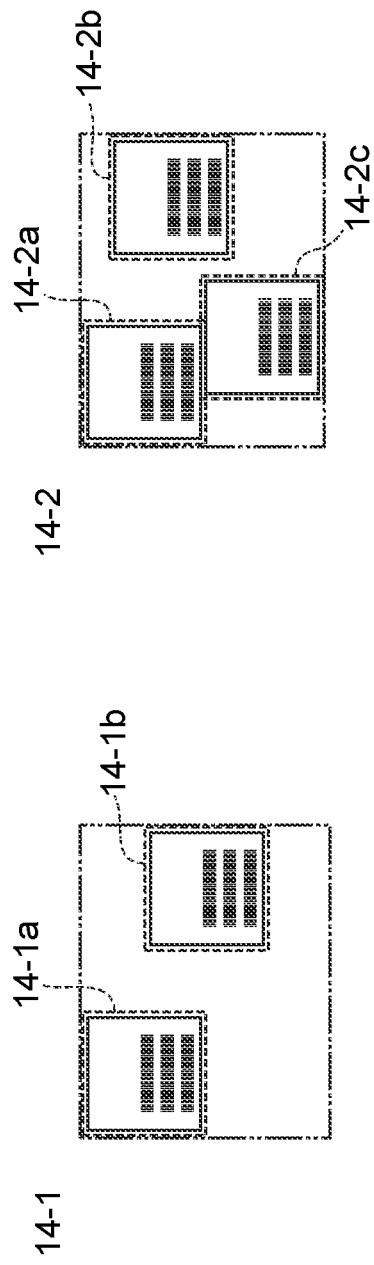
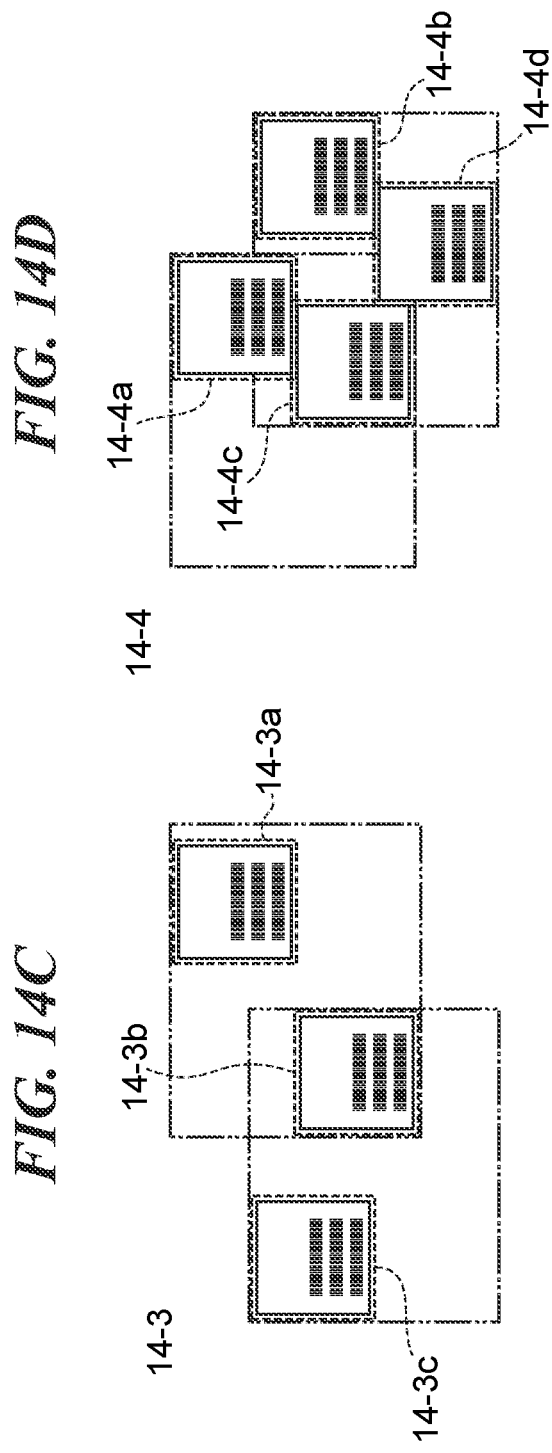

*FIG. 17*

| BAR CODE TYPE | REQUIRED RESOLUTION |
|---|---|
| BAR CODE TYPE (1) | 300 pix |
| BAR CODE TYPE (2) | 200 pix |
| BAR CODE TYPE (3) | 400 pix |

IMAGE PROCESSING APPARATUS OF REDUCING WHOLE OPERATION TIME OF ARRIVAL INSPECTION, IMAGE PROCESSING METHOD, AND STORAGE MEDIUM

BACKGROUND OF THE DISCLOSURE

Field of the Disclosure

The disclosure relates to an image processing apparatus that is capable of reducing the whole operation time of arrival inspection, an image processing method, and a storage medium.

Description of the Related Art

In recent years, a system is entering widespread use which is capable of controlling panning, tilting, and zooming (hereinafter also simply referred to as "PTZ") of a camera set in a remote place (such as a network camera) from a terminal on an operating side via a network. As related art, there have been proposed techniques in Japanese Laid-Open Patent Publication (Kokai) No. 2019-220829 and Japanese Laid-Open Patent Publication (Kokai) No. 2011-150460. According to the technique disclosed in Japanese Laid-Open Patent Publication (Kokai) No. 2019-220829, a system used for arrival inspection roughly retrieves bar codes written on tags attached to respective packages, and photographs each roughly retrieved bar code by panning, tilting, and zooming the same to thereby detect a bar code from each acquired bar code image. Further, according to the technique disclosed in Japanese Laid-Open Patent Publication (Kokai) No. 2011-150460, a storage/shipment management system for managing a storage/shipment state of packages placed in an area performs photographing through a wide area where the packages are placed, by controlling panning, tilting, and zooming, and a bar code is detected from each of acquired images of the packages.

However, in the above-mentioned techniques disclosed in Japanese Laid-Open Patent Publication (Kokai) No. 2019-220829 and Japanese Laid-Open Patent Publication (Kokai) No. 2011-150460, to photograph a wide range which is not included within the male of view of a camera, it is necessary to use the functions of panning, tilting, and zooming (PTZ function) of the camera whenever photographing is performed. That is, according to the technique disclosed in Japanese Laid-Open Patent Publication (Kokai) No. 2019-220829, it is necessary to repeatedly perform photographing after panning, tilting, and zooming, the number of times corresponding to the number of roughly retrieved bar codes, which increases the whole operation time of arrival inspection for detecting all bar codes. According to the technique disclosed in Japanese Laid-Open Patent Publication (Kokai) No. 2011-150460, to detect a bar code, photographing through a wide area is performed while panning, tilting, and zooming such that no portion of a predetermined area is left unphotographed, and hence as the number of times of photographing is increased, the number of times of performing the operations of panning, tilting, and zooming is also increased, which increases the whole operation time. The photographing performed after panning, tilting, and zooming is hereinafter simply referred to as the "PTZ photographing".

SUMMARY OF THE DISCLOSURE

In a first aspect of the embodiments, there is provided an image processing apparatus including processing equipment including a processor, and a memory storing a program which, when executed by the processor, causes the image processing apparatus to: communicate with an image capture device having panning, tilting, and zooming functions, detect a code area by performing a matching process on a whole object image area which is acquired by photographing an area including a whole predetermined object on which codes are attached, by the image capture device, and includes codes to be read, set a zoom magnification setting value, generate grouped areas by grouping a plurality of the detected code areas, based on an angle of view to be set when performing photographing with zooming at the set zoom magnification setting value, control the image capture device to perform panning, tilting, and zooming operations, such that the generated grouped areas are sequentially photographed at the zoom magnification setting value, set an image processing area with respect to a group image obtained by performing the panning, tilting, and zooming operations and photographing each of the generated grouped areas by controlling the image capture device, and perform code reading for reading information on each code area included in the set image processing area.

In a second aspect of the embodiments, there is provided a method of controlling an image processing apparatus, including communicating with an image capture device having panning, tilting, and zooming functions, detecting a code area by performing a matching process on a whole object image area which is acquired by photographing an area including a whole predetermined object on which codes are attached, by the image capture device, and includes codes to be read, setting a zoom magnification setting value, generating grouped areas by grouping a plurality of the detected code areas, based on an angle of view to be set when performing photographing with zooming at the set zoom magnification setting value, controlling the image capture device to perform panning, tilting, and zooming operations, such that the generated grouped areas are sequentially photographed at the zoom magnification setting value, setting an image processing area with respect to a group image obtained by performing the panning, tilting, and zooming operations and photographing each of the generated grouped areas by controlling the image capture device, and performing code reading for reading information on each code area included in the set image processing area.

Further features of the disclosure will become apparent from the following description of exemplary embodiments (with reference to the attached drawings).

BRIEF DESCRIPTION OF THE DRAWINGS

FIGS. 14A to 14D are diagrams showing an example of grouping search and group number duplication deletion performed by the image processing apparatus of the image processing system according to the embodiment.

FIG. 17 is a diagram useful in explaining the variation of the preparation process in FIG. 16.

DESCRIPTION OF THE EMBODIMENTS

The disclosure will now be described in detail below with reference to the accompanying drawings showing embodiments thereof. However, the components described in the following embodiments are described only by way of example, and are by no means intended to limit the scope of the disclosure to them alone.

Figure 1:
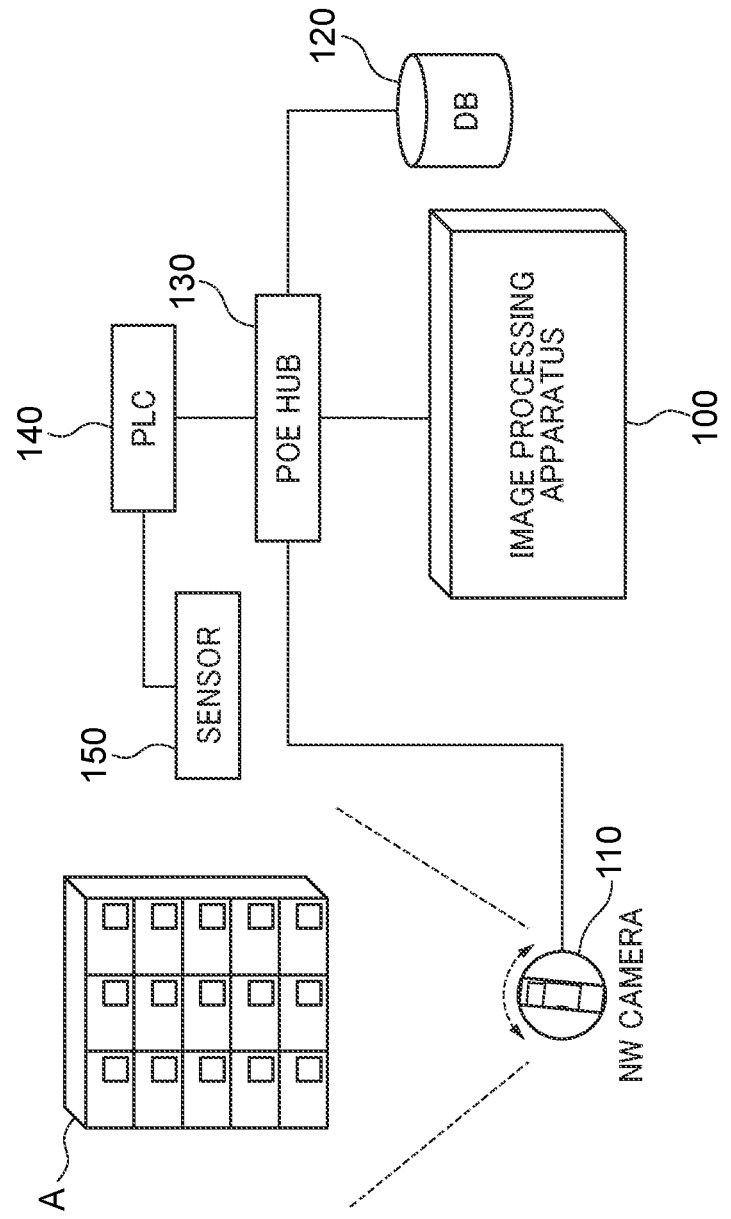
FIG. 1 is a block diagram showing an example of the whole configuration of an image processing system according to an embodiment of the disclosure.

An embodiment of the disclosure will be described with reference to the accompanying drawings. FIG. 1 is a block diagram showing an example of the whole configuration of an image processing system according to the embodiment of the disclosure.

The image processing system according to the embodiment is used for arrival inspection and is operated as an arrival inspection system for inspecting cargo. As shown in FIG. 1, the image processing system according to the embodiment is the arrival inspection system that performs the arrival inspection operation by photographing cargo A carried into e.g. a factory, reading bar codes attached to packages included in the cargo A, and checking the read bar codes against bar code information registered in advance.

In the embodiment, tags are attached to respective packages included in the cargo A, and a bar code (one-dimensional code) is written on each tag. The image processing system according to the embodiment sequentially reads bar codes written on the respective tags attached to the packages, and checks information of each read bar code against bar code information registered in advance.

Note that although in the embodiment, since the bar code is written on each tag, an object to be read and checked is the bar code, in the embodiment according to the disclosure, the object to be read and checked is not limited to the bar code, but any other code may be used insofar as it enables identification of a tag. For example, numbers, characters, or marks, or a combination of numbers, characters, and marks, or a variety of two-dimensional codes, such as a QR code (registered trademark), may be used.

The image processing system according to the embodiment includes an image processing apparatus 100, a network camera 110 (hereinafter referred to as the "NW camera 110"), a database 120 (hereinafter referred to as the "DB 120"), and a sensor 150. Further, the image processing system according to the embodiment includes a power over Ethernet hub 130 (hereinafter referred to as the "POE hub 130") and a programmable logic controller 140 (hereinafter referred to as the "PLC 140").

The POE hub 130 is connected to the image processing apparatus 100, the NW camera 110, the DB 120, and the PLC 140, communicates with the connected components, and supplies electric power to the connected components. The DB 120 stores, in advance, information on bar codes written on a plurality of tags attached to a plurality of packages to be carried in, respectively. The PLC 140 as image processing system control means controls the overall operation of the image processing system. The sensor 150 as carried-in cargo detection means detects that cargo has been carried into a predetermined place.

The image processing apparatus 100 is connected to the NW camera 110 having the PTZ function via the POE hub 130, controls, as PTZ controlling means, the PTZ operations of the NW camera 110, and photographing performed by the NW camera 110. The NW camera 110 as an image capture device is arranged to photograph a place into which the cargo A is carried and photographs the cargo A which has been carried in, under the control of the image processing apparatus 100. Here, the cargo A is a stack of a plurality of packages to each of which a tag is attached, and a bar code is written on each tag. Further, the image processing apparatus 100 as an information reading unit performs bar code reading on the bar codes of the plurality of tags included in an image processing area set for a group image (zoom image) obtained through photographing performed by the NW camera 110. With this, the image processing apparatus 100 reads, on a bar code-by-bar code basis, information on a bar code written on each tag. Next, the image processing apparatus 100 checks the read information of the bar code (i.e. a bar code reading result obtained in a step S1008, described hereinafter) against the information on the bar code, which is stored in the DB 120 in advance (i.e. the information of a bar code written on a tag of each package scheduled to be carried in). The arrival inspection operation is thus performed by the image processing system according to the embodiment, whereby it is possible to confirm that the packages scheduled to be carried in have been carried in as scheduled.

Figure 2:
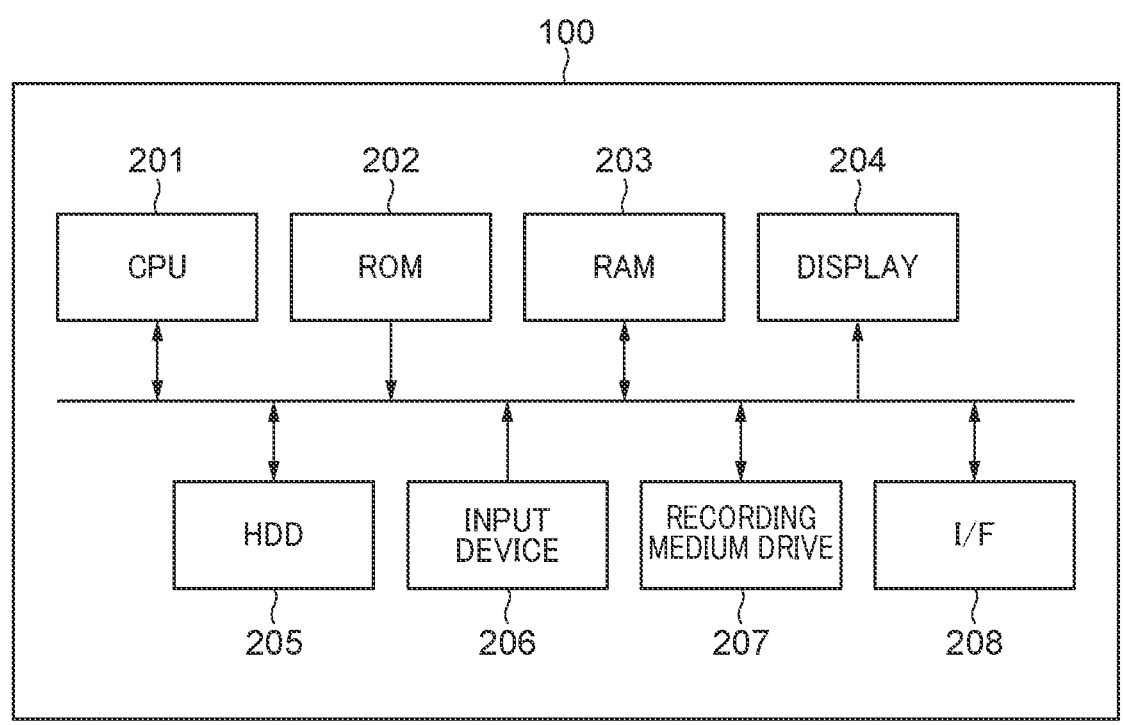
FIG. 2 is a block diagram showing an example of the hardware configuration of an image processing apparatus of the image processing system according to the embodiment.

Next, the image processing apparatus 100 of the image processing system according to the embodiment will be described. FIG. 2 is a block diagram showing an example of the hardware configuration of the image processing apparatus 100.

As shown in FIG. 2, the image processing apparatus 100 includes a central processing unit 201 (hereinafter referred to as the "CPU 201"), a read only memory 202 (hereinafter referred to as the "ROM 202"), and a random access memory 203 (hereinafter referred to as the "RAM 203"). Further, the image processing apparatus 100 includes a display 204, a hard disk drive 205 (hereinafter referred to as the "HDD 205"), an input device 206, a recording medium drive 207, and an interface 208 (hereinafter referred to as the "I/F 208").

The CPU 201 loads control programs stored in the ROM 202 into the RAM 203 and executes a variety of processing operations. The RAM 203 is used as a main memory and a temporary storage area, such as a work area, for the CPU 201. The HDD 205 stores a variety of data, a variety of programs, and so forth. The display 204 as display means displays a variety of data including image data and a variety of information. The input device 206 as input means receives a variety of operations performed by a user. The recording medium drive 207 reads out and writes data from and into a recording medium, such as a flash memory. The I/F 208 performs communication with external equipment.

Note that the variety of processing operations performed by the image processing apparatus 100 and the variety of functions equipped in the image processing apparatus 100, described hereinafter, are realized by the CPU 201 that loads the programs stored in the ROM 202 or the HDD 205 into the RAM 203 and executes the loaded programs. Further, the variety of processing operations performed by the image processing apparatus 100 and the variety of functions equipped in the image processing apparatus 100 may be realized by the CPU 201 that loads the programs stored in a recording medium, such as a flash memory, into the RAM 203 and executes the loaded programs. Further, at least part of the variety of processing operations performed by the image processing apparatus 100 and the variety of functions equipped in the image processing apparatus 100 may be realized by operating a plurality of CPUs, RAM, ROMs, and storages in cooperation. Furthermore, at least part of the variety of processing operations performed by the image processing apparatus 100 and the variety of functions equipped in the image processing apparatus 100 may be realized by using a circuit, such as an ASIC.

Figure 3:
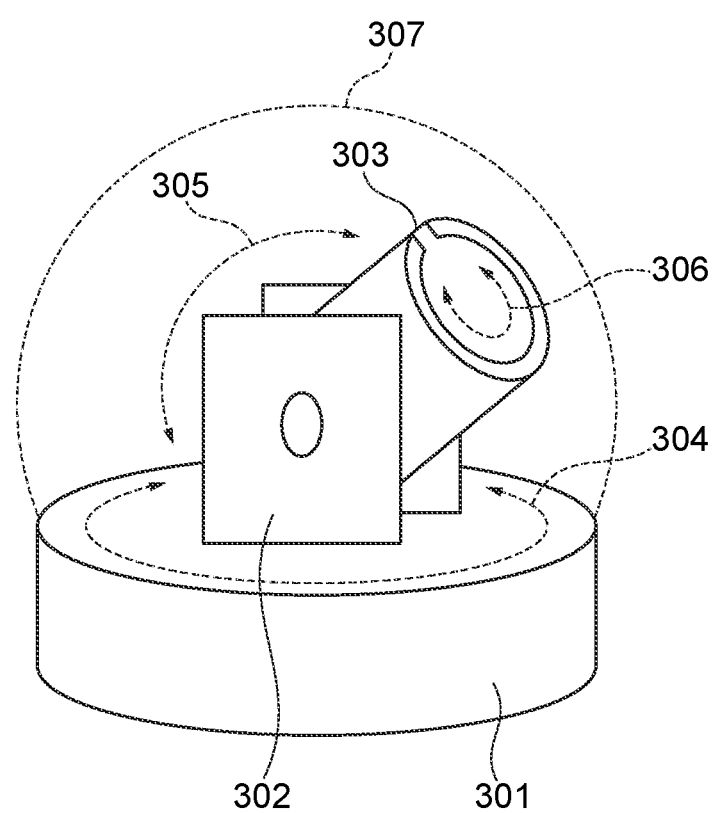
FIG. 3 is a view of the appearance of a network camera of the image processing system according to the embodiment.

Next, the appearance and the PTZ driving of the NW camera 110 of the image processing system according to the embodiment will be described. FIG. 3 shows an example of the appearance of the NW camera 110.

As shown in FIG. 3, the dome-shaped NW camera 110 has the whole camera covered with a dome 307. A panning drive unit 301 drives a pan motor (not shown) to change the orientation of a lens barrel section 303 in a panning direction denoted by reference numeral 304. Further, a tilting drive unit 302 drives a tilt motor (not shown) to change the orientation of the lens barrel section 303 in a tilting direction denoted by reference numeral 305. Further, the lens barrel section 303 including a lens, not shown, is rotatable about the lens center position in a rotation direction denoted by reference numeral 306 by the control of a rotation motor (not shown). Further, the lens barrel section 303 includes a focus lens (not shown) and a zoom lens (not shown), each of which is driven by a stepping motor (not shown).

Note that the NW camera 110 used in the image processing system according to the embodiment is not limited to the camera that has the appearance shown in FIG. 3 and is driven for the above-mentioned PTZ operation, but any other camera may be employed insofar as it has at least panning, tilting, and zooming drive systems and can be remotely controlled to perform the PTZ operation.

Figure 4:
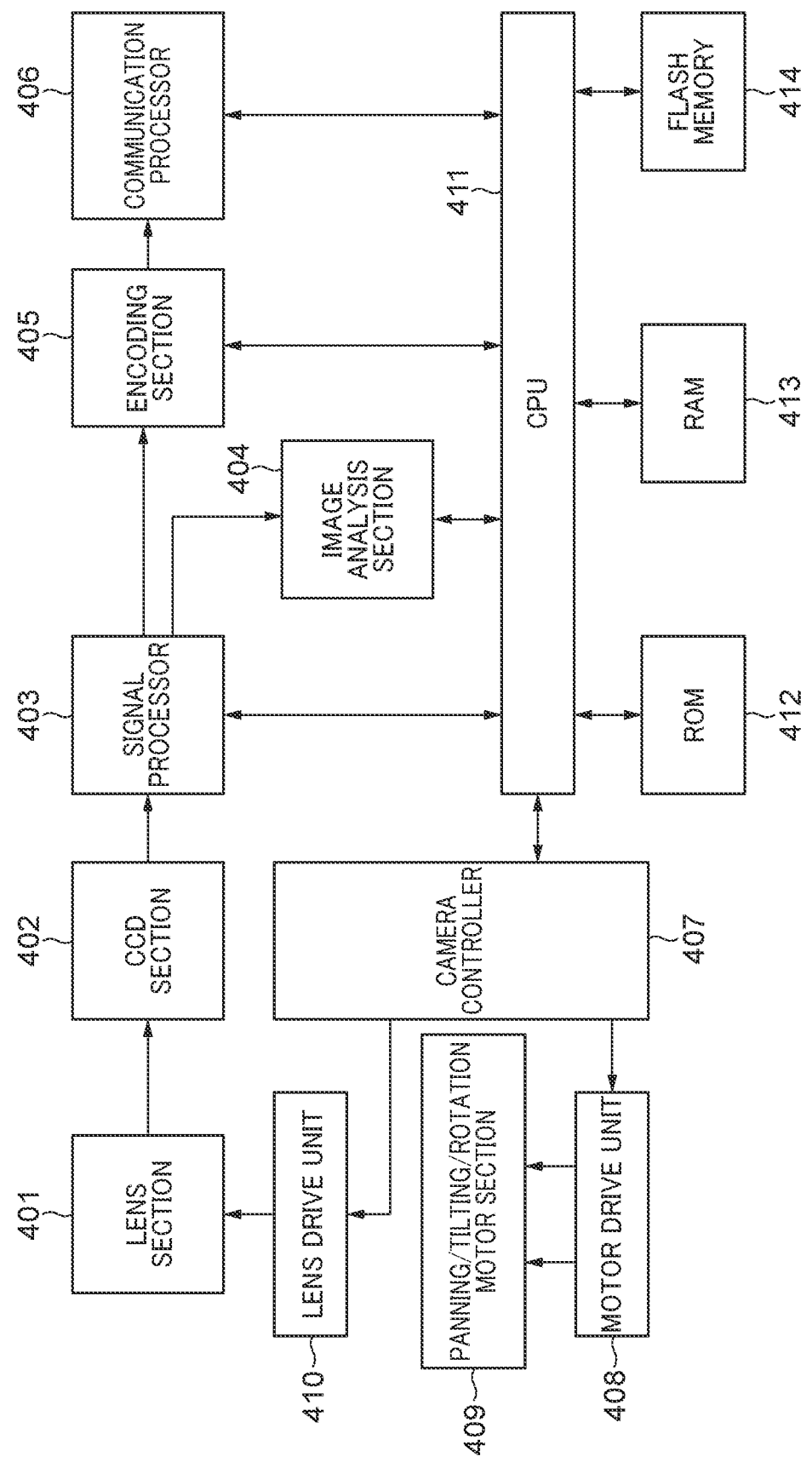
FIG. 4 is a block diagram showing an example of the hardware configuration of the network camera of the image processing system according to the embodiment.

Next, the configuration of the NW camera 110 in the image processing system according to the embodiment will be described. FIG. 4 is a block diagram showing an example of the hardware configuration of the NW camera 110.

As shown in FIG. 4, the NW camera 110 includes a lens section 401, a CCD section 402, a signal processor 403, an image analysis section 404, an encoding section 405, a communication processor 406, a camera controller 407, a motor drive unit 408, and a panning/tilting/rotation motor section 409. Further, the NW camera 110 includes a lens drive unit 410, a CPU 411, a ROM 412, a RAM 413, and a flash memory 414.

Hereafter, a process up to a step for delivering image data photographed by the NW camera 110 to the image processing apparatus 100 will be described. An optical image captured from the lens section 401 is converted to RGB digital data by the CCD section 402 and is then sent to the signal processor 403. The signal processor 403 performs conversion of the RGB digital data to digital data (image data) in a YCbCr 4:2:0 format or a YCbCr 4:2:2 format, conversion of the image size of the digital data to a requested image size of an image to be transmitted, a variety of filtering, and so forth. The image data processed by the signal processor 403 is sent to the image analysis section 404 and sent to the encoding section 405 at the same time.

The encoding section 405 executes processing for encoding and compressing the image data to a predetermined format, such as a H.264 format or a JPEG format. The H.264 moving image stream data or each JPEG still image data generated by the encoding section 405 is transmitted to the image processing apparatus 100 according to a network protocol, such as TCP/IP, HTTP, or RTP, by the communication processor 406.

The image analysis section 404 performs processing for analyzing the photographed image data and detecting whether or not an object or an image pattern of a specified condition is included in the target image. The processing blocks of the signal processor 403, the image analysis section 404, the encoding section 405, and the communication processor 406 are connected to the CPU 411. The camera controller 407 is connected to the motor drive unit 408 and the lens drive unit 410. The camera controller 407 outputs control signals for controlling the panning, tilting, and rotation operations (movement in the panning direction, movement in the tilting direction, and rotation about the optical axis) of the camera and a control signal for controlling a zooming operation and an auto-focusing operation.

Further, the camera controller 407 controls at least one of a visible ranee and a movable range of the NW camera 110 according to at least one of a visible range setting and a movable range selling which are stored in the RAM 413. The motor drive unit 408 includes a motor drive circuit (not shown) and so forth, and drives the panning/tilting/rotation motor section 409 according to a control signal output from the camera controller 407, and the photographing direction of the camera can be changed by rotation of the motor. The lens drive unit 410 has a motor and a motor drive circuit (not shown) for performing the control of zooming, auto-focusing, and so forth, and controls the lens section 401 according to a control signal output from the camera controller 407.

The CPU 411 controls the overall operation of the NW camera 110 by executing control programs stored in the ROM 412. The ROM 412, the RAM 413, and the flash memory 414 are connected to the CPU 411. Further, the CPU 411 is also connected to the signal processor 403, the image analysis section 404, the encoding section 405, and the communication processor 406, and controls each processing block by executing start/stop of an operation thereof, setting of an operation condition thereof, acquisition of an operation result thereof, and so forth, for each processing block. The ROM 412 stores programs and data used by the CPU 411 to perform the control of the NW camera 110, such as application processing.

The RAM 413 is a memory used for writing and reading data when the CPU 411 executes the programs stored in the ROM 412. In the RAM 413, there are arranged a work area, a temporary saving area, and the like, which are used by the CPU 411 to execute the programs when controlling the NW camera 110. At least one of the visible range setting for specifying the range of the photographable angle of view and the movable range setting for specifying a range in which the camera is movable in the panning direction, the tilting direction, and the zooming direction is stored in the RAM 413.

The CPU 411 changes the photographing direction and the zoom magnification according to control commands received form the image processing apparatus 100 via the communication processor 406. In a case where control commands specifying the center position and the zoom magnification are received from the NW camera 110, the CPU 411 controls panning and tilting such that the photographing center is brought to the specified center position corresponding to "the center position of a grouped area", referred to hereinafter, and controls zooming such that the zooming magnification becomes equal to the specified zoom magnification.

Figure 5:
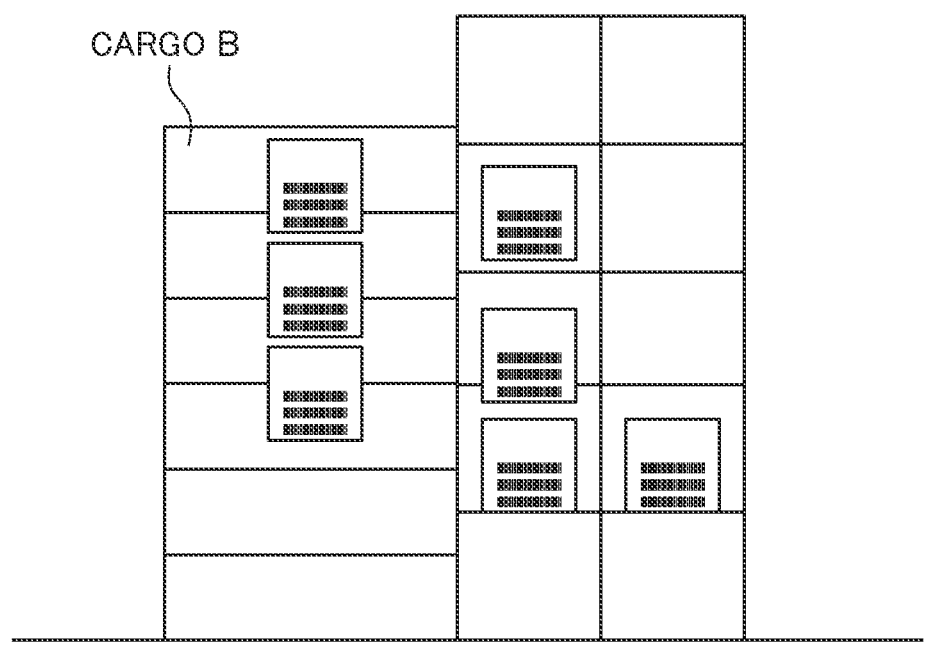
FIG. 5 is a diagram showing cargo as an image processing target in a case where the image processing system according to the embodiment is used for arrival inspection.

As mentioned above, the image processing system according to the embodiment is used for arrival inspection. FIG. 5 is a diagram showing cargo as an image processing target in a case where the image processing system according to the embodiment is used for arrival inspection. As shown in FIG. 5, the image processing target of the image processing system according to the embodiment is cargo B in which tags are not regularly arranged. The image processing apparatus 100 generates a matching model from a whole image, described hereinafter, performs image matching, and determines a range of zoom photographing according to a matching result.

Figure 6:
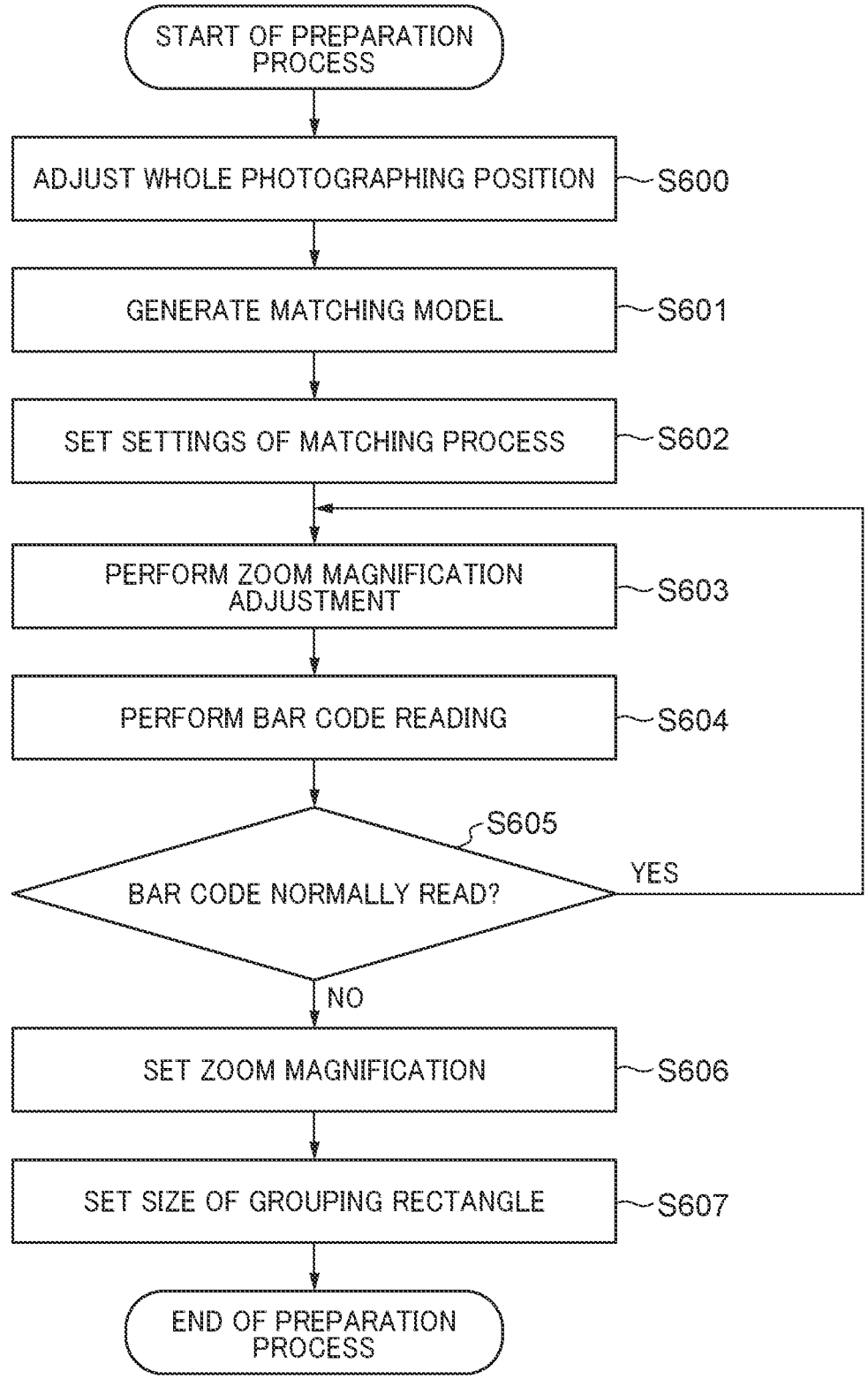
FIG. 6 is a flowchart of a preparation process performed by the image processing apparatus of the image processing system according to the embodiment.

Before the image processing system according to the embodiment is used as the arrival inspection system, the image processing apparatus 100 performs a preparation process. Here, the preparation process performed by the image processing apparatus 100 of the image processing system according to the embodiment swill be described. FIG. 6 is a flowchart of the preparation process performed by the image processing apparatus 100. Note that in the following description, a prefix S represents a step.

First, in a step S600 the image processing apparatus 100 adjusts the photographing position (hereinafter referred to as the "whole cargo photographing position") of the NW camera 110, which is set when photographing the whole cargo, and the like, according to an operation performed by a user (hereinafter also referred to as the "user operation"), received by the input device 206. More specifically, the image processing apparatus 100 displays a photographed image transmitted from the NW camera 110 on the display 204, and the user controls panning, tilting, and zooming, while viewing the displayed image, to adjust the whole cargo photographing position and the zoom magnification such that the whole cargo is photographed. Thus, by the processing performed in the step S600, the adjusted whole cargo photographing position and zoom magnification for photographing the whole image are obtained, that is, the photographing conditions of the whole image (the whole cargo photographing position and the zoom magnification for photographing the whole image) are set.

In the step S600, after the photographing conditions of the whole image are set, the NW camera 110 performs photographing at the adjusted whole cargo photographing position, thereby acquiring an image in which the whole cargo is photographed (hereinafter also referred to as the "whole image"), and transmits the acquired whole image to the image processing apparatus 100. The CPU 201 of the image processing apparatus 100 controls the display 204 to display the received whole image as a control unit.

Figure 7:
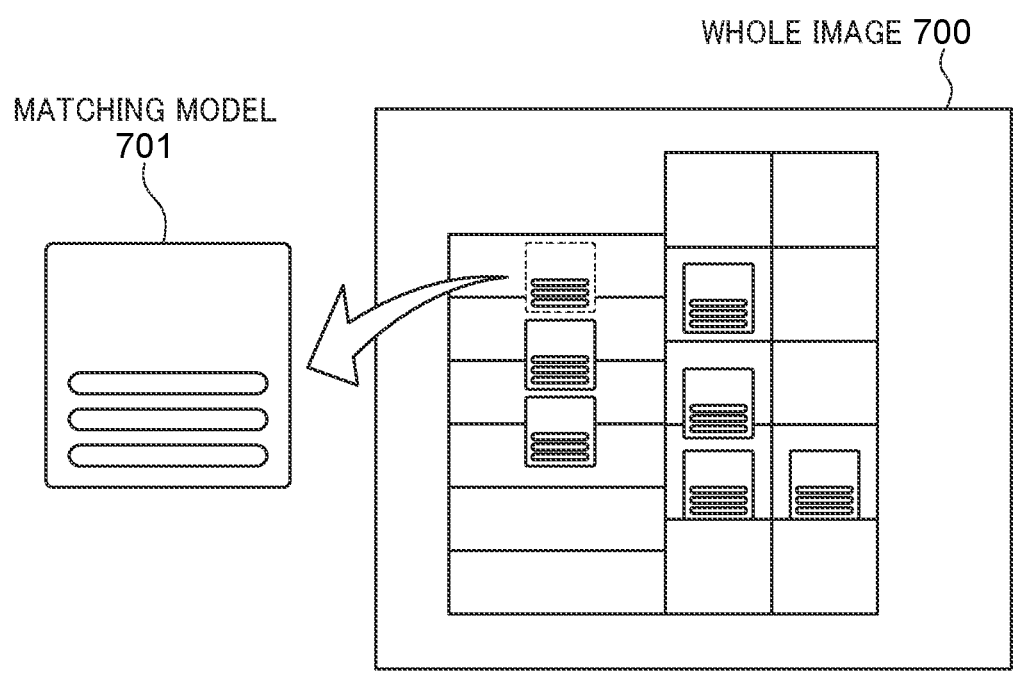
FIG. 7 is a diagram showing a method of generating a matching model in the preparation process performed by the image processing apparatus of the image processing system according to the embodiment.

Next, in a step S601, the CPU 201 as matching model-generating means generates a matching model (model image). FIG. 7 is a diagram showing a method of generating a matching model. More specifically, as shown in FIG. 7, the CPU 201 designates a tag area from a whole image 700 obtained by photographing the whole cargo, extracts an image of the designated tag area as a tag image, and sets the extracted tag image as a matching model (model image) 701. The whole image includes all bar codes written on the tags to be read.

Figure 8:
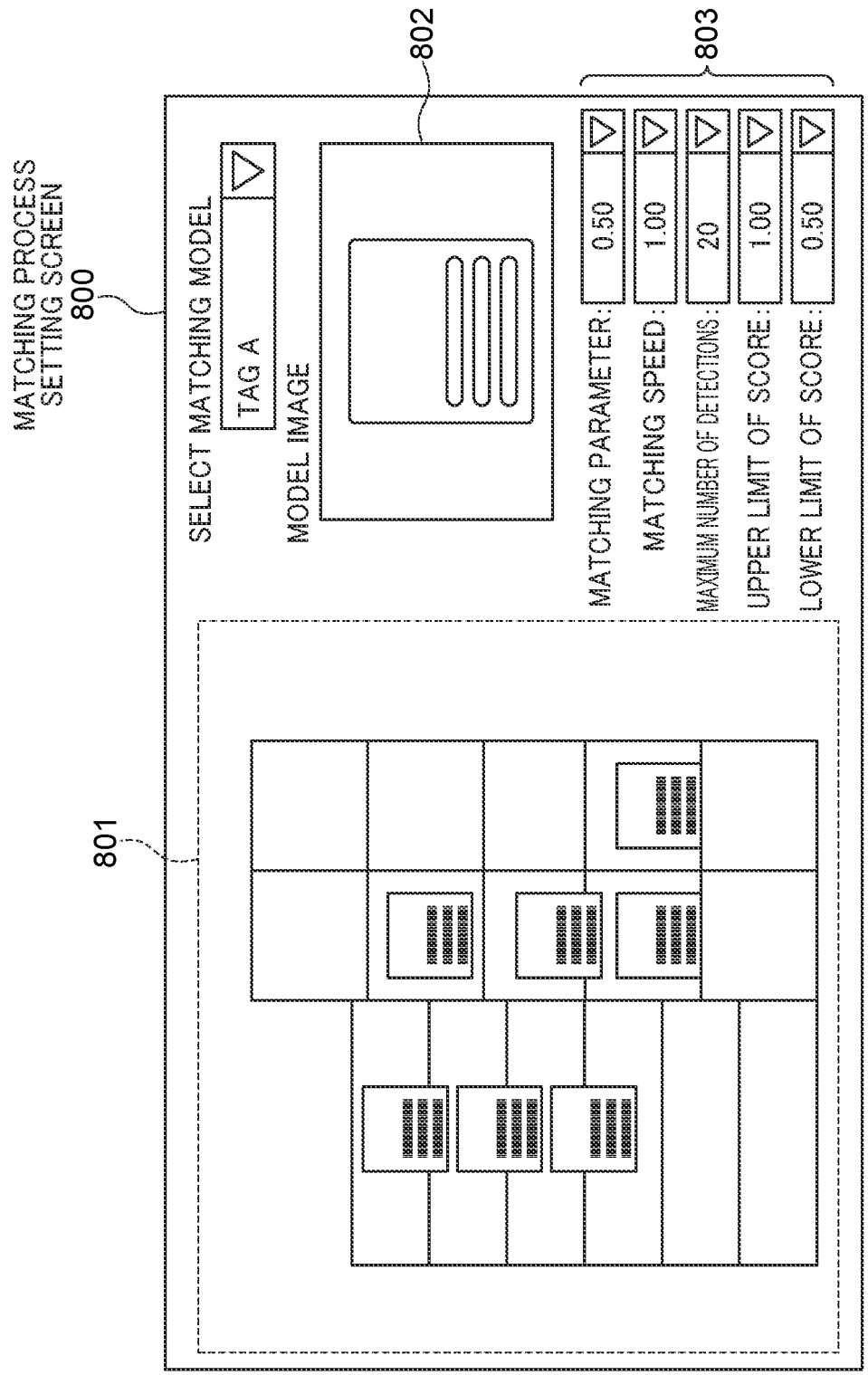
FIG. 8 is a diagram showing an example of a setting screen used in a matching process performed by the image processing apparatus of the image processing system according to the embodiment.

Next, in a step S602, the CPU 201 sets settings of a matching process. FIG. 8 is a diagram showing an example of a setting screen of the matching process. More specifically, for example, the CPU 201 sets a target area for an image matching process based on a frame 801 set by the user on the matching process setting screen, denoted by reference numeral 800, shown in FIG. 8. Further, in the step S602, the CPU 201 sets a matching model according to a user operation. Here, setting a matching model means designating the generated matching model as a model image, so as to use the matching model generated in the step S601 as a reference image of the image matching process.

The matching model (model image) set in the step S602 is displayed on a matching model-displaying area 802. Further, in the step S6202, the CPU 201 sets matching parameters according to a user's input to a matching parameter-setting area 803. Furthermore, in the step S602, the CPU 201 determines an order of operations of the matching process. For example, the CPU 201 determines the order of operations of the matching process such that the matching process is performed in an ascending/descending order of x coordinates or an ascending/descending order of y coordinates.

Figure 9:
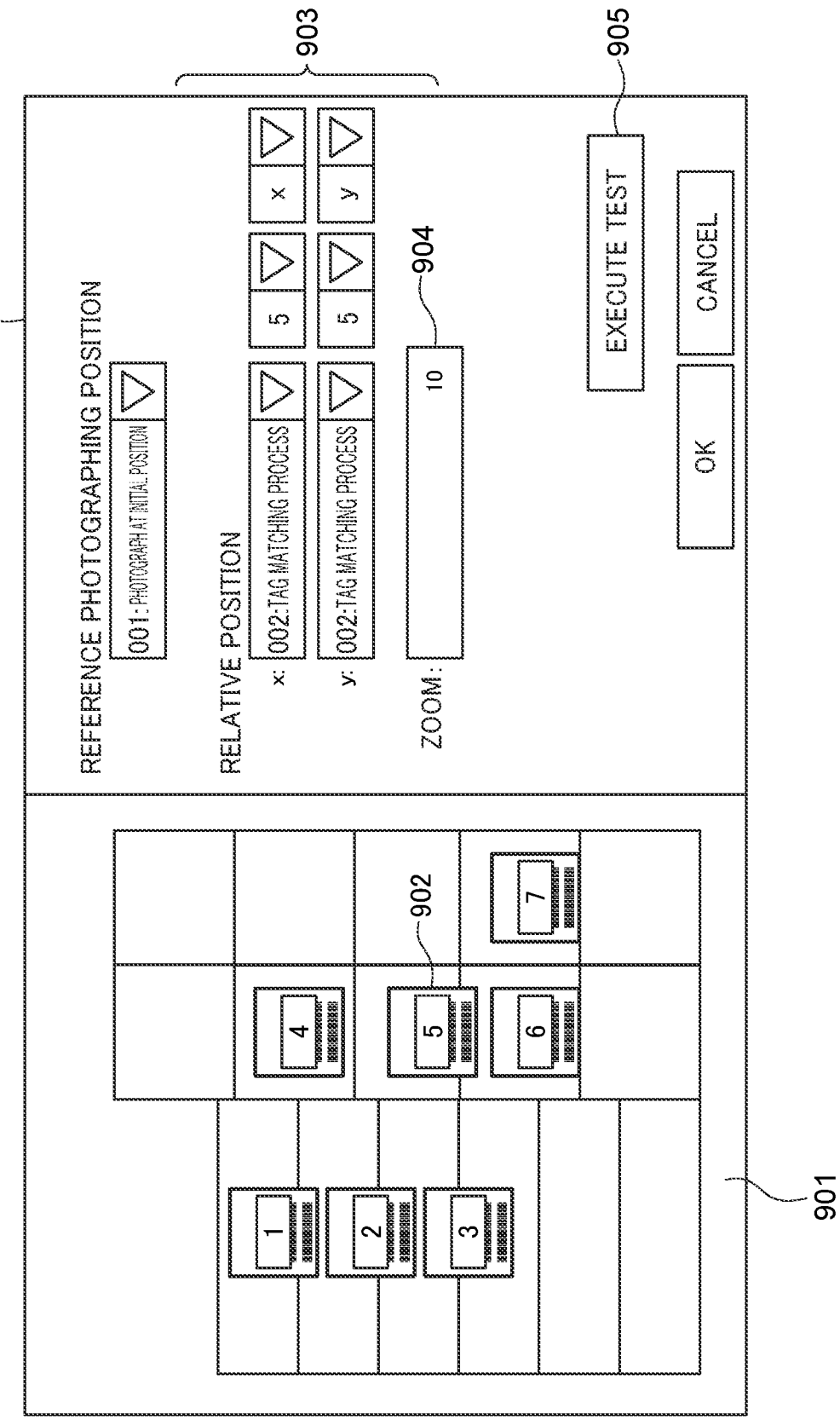
FIG. 9 is a diagram showing an example of a test screen of panning, tilting, and zooming of the network camera in the image processing system according to the embodiment.

When the image matching process is performed, the CPU 201 displays a matching test screen 900, shown in FIG. 9, on the display 204. FIG. 9 is a diagram showing an example of the test screen of panning, tilting, and zooming of the NW camera 110. As shown in FIG. 9, the whole image is displayed in a display area 901 of the matching test screen 900, and frames 902 indicating matching results are superimposed on the whole image. The user confirms the frames 902 (matching results) indicating matching results superimposed on the whole image. If it is determined by user's confirmation that there is a tag area which is not successful in image matching, the user can specify again the position of zoom photographing in a zoom photographing position-setting area 903 and set again the zoom magnification in a zoom magnification-setting area 904. Thus, at least one of tag areas detected in the matching process is set as the position of test zoom photographing.

Next, in a step S603, the CPU 201 as zoom magnification-adjusting means performs zoom magnification adjustment processing on the matching test screen 900. More specifically, when the CPU 201 detects that a test execution button 905 is pressed by the user in a state in which the zoom photographing position and the zoom magnification have been set, the CPU 201 generates control commands according to the settings and transmits the generated control commands to the NW camera 110. The NW camera 110 receives the control commands from the image processing apparatus 100, acquires a zoom image by performing panning, tilting and zooming according to the settings indicated by the received control commands and performing photographing processing, and transmits the acquired zoom image to the image processing apparatus 100. Note that the zoom image refers to an image obtained by the zoom photographing.

Next, in a step S604, the CPU 201 performs bar code reading on the received zoom image and displays a result of the bar code reading (hereinafter simply referred to as the "bar code reading result") in the display area 901.

Then, in a step S605, the CPU 201 executes processing for determining whether or not the bar code has been normally read, according to a user operation. More specifically, in the step S605, the user checks whether or not the bar code has been normally read from the zoom image based on the bar code reading result displayed in the display area 901.

If it is confirmed by the user in the step S605 that the bar code has been normally read, a first determination signal indicating that the bar code has been normally read is transmitted to the image processing apparatus 100 via the input device 206. If the first determination signal has been received, the CPU 201 determines that zoom magnification adjustment is not completed, and temporarily stores the current zoom magnification in the RAM 203 as the zoom magnification at which the bar code has been normally read and returns to the step S603.

Then, in the step S603, the CPU 201 performs the zoom magnification adjustment processing for reducing the zoom magnification, and in the step S604, the CPU 201 performs the bar code reading again on a zoom image photographed at the zoom magnification reduced by the zoom magnification adjustment processing. Thus, the CPU 201 repeatedly performs the zoom magnification adjustment processing for reducing the zoom magnification in the step S603 until it is determined in the step S605 that the bar code cannot be normally read. That is, the CPU 201 performs the zoom magnification adjustment processing by repeating the processing for acquiring a zoom image photographed by zoom photographing while reducing the zoom magnification and executing the bar code reading on the acquired zoom image.

On the other hand, if it is determined in the step S605 that the bar code cannot be normally read, the CPU 201 proceeds to a step S606. More specifically, in a case where it is confirmed by the user in the step S605 that the bar code cannot be normally read, a second determination signal indicating that the bar code cannot be normally read is transmitted to the image processing apparatus 100 via the input device 206. If the second determination signal has been received, the CPU 201 proceeds to the step S606.

In the step S606, the CPU 201 as a zoom magnification-setting unit sets the zoom magnification. More specifically, in the step S606, the CPU 201 calls the last zoom magnification at which the bar code has been normally read form the RAM 203, stores the called zoom magnification in the HDD 205 as a zoom magnification selling value of the image processing system according to the embodiment, and then proceeds to a step S607.

In the step S607, the CPU 201 sets a size of a grouping rectangle, described hereinafter, based on the size of the whole image (hereinafter referred to as the "whole image size"), the zoom magnification for photographing the whole image (hereinafter referred to as the "whole image photographing zoom magnification"), and the zoom magnification setting value. That is, in the step S607, the CPU 201 calculates the size of the grouping rectangle (hereinafter referred to as the "grouping rectangle size") based on the following equation (1):

$$\text{grouping rectangle size} = (\text{whole image photographing zoom magnification} / \text{zoom magnification setting value}) \times \text{whole image size} \quad (1)$$

For example, in a case where the whole image photographing zoom magnification is onefold, and the zoom magnification setting value is threefold, the grouping rectangle size calculated based on the above equation (1) becomes a size corresponding to ⅓ of the whole image size. In the step S607, the CPU 201 stores the grouping rectangle size thus calculated (set) in the HDD 205, followed by terminating the preparation process.

Figure 10:
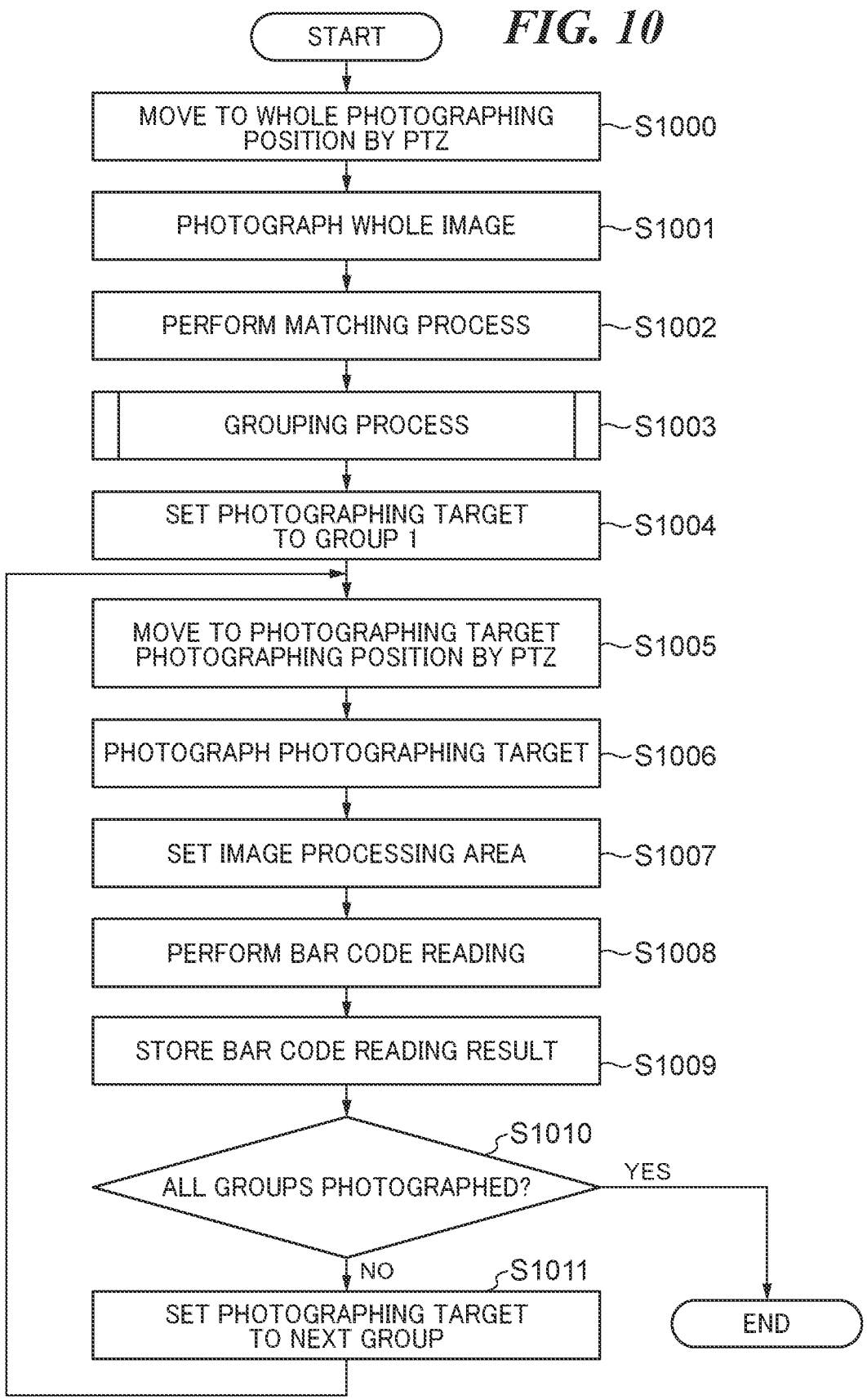
FIG. 10 is a flowchart of an operation process performed by the image processing apparatus of the image processing system according to the embodiment.

As described above, after the image processing apparatus 100 performs the preparation process, the image processing system according to the embodiment can be operated as the arrival inspection system, that is, the image processing apparatus 100 performs the operation process. Hereafter, the operation process performed by the image processing apparatus 100 of the image processing system according to the embodiment will be described. FIG. 10 is a flowchart of the operation process performed by the image processing apparatus 100 of the image processing system.

First, in a step S1000, the CPU 201 of the image processing apparatus 100 generates control commands based on the photographing conditions of the whole image, which are set in the step S600 in the preparation process, and transmits the generated control commands to the NW camera 110. Then, the NW camera 110 receives the control commands from the image processing apparatus 100 and moves to the whole cargo photographing position by performing panning, tilting, and zooming according to the settings indicated by the received control commands. Next, in a step S1001, the NW camera 110 acquires the whole image by executing whole cargo photographing processing for photographing the whole image and transmits the acquired whole image to the image processing apparatus 100.

Next, in a step S1002, the CPU 201 performs the matching process on the whole image received in the step S1001. More specifically, in the step S1002, the CPU 201 that functions as a bar code detection unit detects tag areas (i.e. bar code areas) by performing the matching process on the received whole image according to the information set by the preparation process in FIG. 6. The tag areas detected in the matching process in the step S1002 (bar code areas) are hereinafter also simply referred to as the "detected areas". Further, the number of tag areas (detected areas) detected by the matching process in the step S1002 is represented by N.

In a step S1003, the CPU 201 that functions as a group generating unit performs a grouping process for grouping the detected areas into groups by assigning a group number to each group of areas detected by the matching process in the step S1002 to thereby generate groups (grouped areas). The grouping process is a process for making it possible to perform arrival inspection, by the number of nines of PTZ photographing operations, which is smaller than the number of tags attached to all packages of the cargo B, respectively. Details of the grouping process will be described hereinafter.

Next, in a step S1004, the CPU 201 sets, out of groups generated by the grouping process in the step S1003, a group having a group number 1 as an initial value (hereinafter referred to as the "group 1") as a photographing target. More specifically, in the step S1004, the CPU 201 acquires a grouped area position of the group 1 from the RAM 203 and generates control commands for panning, tilting, and zooming the NW camera 110 for the acquired grouped area position in order to photograph the photographing target.

Next, in a step S1005, the CPU 201 transmits the control commands generated in the step S1004 to the NW camera 110. Then, upon receipt of the control commands from the image processing apparatus 100, the NW camera 110 performs panning, tilting, and zooming according to the settings indicated by the received control commands and moves to a photographing position of the NW camera 110 to be set for photographing the photographing target (hereinafter referred to as the "photographing target photographing position"). In a step S1006, the NW camera 110 performs photographing processing, using the zoom magnification setting value for photographing the photographing target, to thereby acquire an image in which the photographing target is photographed (hereinafter also referred to as the "group image") and transmits the acquired group image to the image processing apparatus 100. Then, the image processing apparatus 100 stores the group image received from the NW camera 110 in the RAM 203.

Next, in a step S1007, the CPU 201 as an image processing area-setting unit sets image processing areas for performing image processing on the group image stored in the RAM 203. The positions of bar codes can be determined based on a grouped area position and a range of the grouped area determined in a step S1005, described hereinafter, and the positions of respective detected areas included in the grouped area, and hence the CPU 201 sets the image processing areas for performing image processing on the positions where the bar codes exist.

Next, in the step S1008, the CPU 201 as an information reading unit performs the bar code reading on the image processing areas set in the group image stored in the RAM 203, for reading information on the bar codes, according to information set on a setting screen. Next, in a step S1009, the CPU 201 stores bar code reading results obtained in the step S1008 in the HDD 205. Note that the bar code reading results obtained in the step S1008 may be stored in a storage section other than the HDD 205 (such as the DB 120 used for arrival inspection processing).

Next, in a step S1010, the CPU 201 performs determination of whether or not photographing for all the groups generated by the grouping process in the step S1003 is completed, and if photographing for all the groups is not completed, the CPU 201 proceeds to a step S1011.

Then, in the step S1011, the CPU 201 sets a group having a group number next to that of the current photographing target group (hereinafter referred to as the "next group") as the photographing target, and then returns to the step S1005. Thus, after changing the photographing target in the step S1011, the CPU 201 returns to the step S1005, and performs photographing, image processing area-setting, and the bar code reading, on the group to be photographed after the change, as performed on the group 1.

That is, the CPU 210 repeats the processing operations from the step S1005 to step S1011 until photographing for all the groups is completed. The CPU 201 as a panning/tilting/zooming control unit controls the panning, tilting, and zooming operations of the NW camera 110 so as to sequentially photograph all groups (grouped areas) generated by the grouping process in the step S1003.

On the other hand, if it is determined in the step S1010 that photographing for all the groups is completed, the CPU 201 terminates the operation process.

Figure 11:
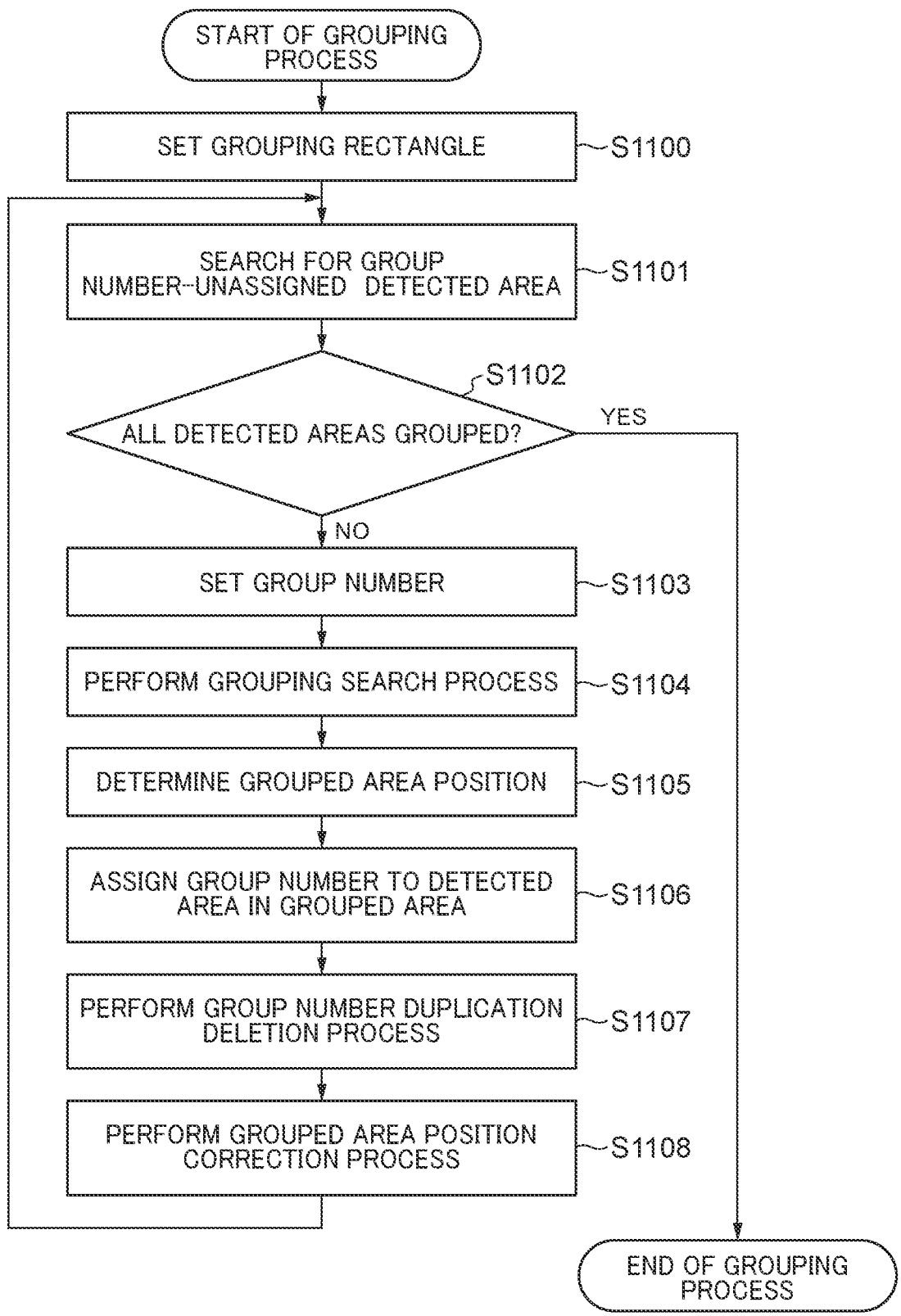
FIG. 11 is a flowchart of a grouping process performed by the image processing apparatus of the image processing system according to the embodiment.

Hereafter, the grouping process performed by the image processing apparatus 100 of the image processing system according to the embodiment will be described. FIG. 11 is a flowchart of the grouping process (the grouping process in the step S1003) performed by the image processing apparatus 100. Further, FIG. 12 is a diagram showing an example of grouping (the grouping process in the step S1003) performed by the image processing apparatus 100.

First, in a step S1100, the CPU 201 reads out the grouping rectangle size stored in the HDD 205 in the step S607, sets the read grouping rectangle size as the size of the grouping rectangle in the grouping process, and proceeds to a step S1101. The grouping rectangle in the grouping process is a rectangle representing the angle of view of the zoom image acquired by zoom photographing using the zoom magnification set in the step S606 in the preparation process (i.e. the zoom magnification setting value stored in the HDD 205). The size of the group image acquired in the step S1006 in the operation process is the same as the size of the grouping rectangle set in the step S1100.

Figure 12:
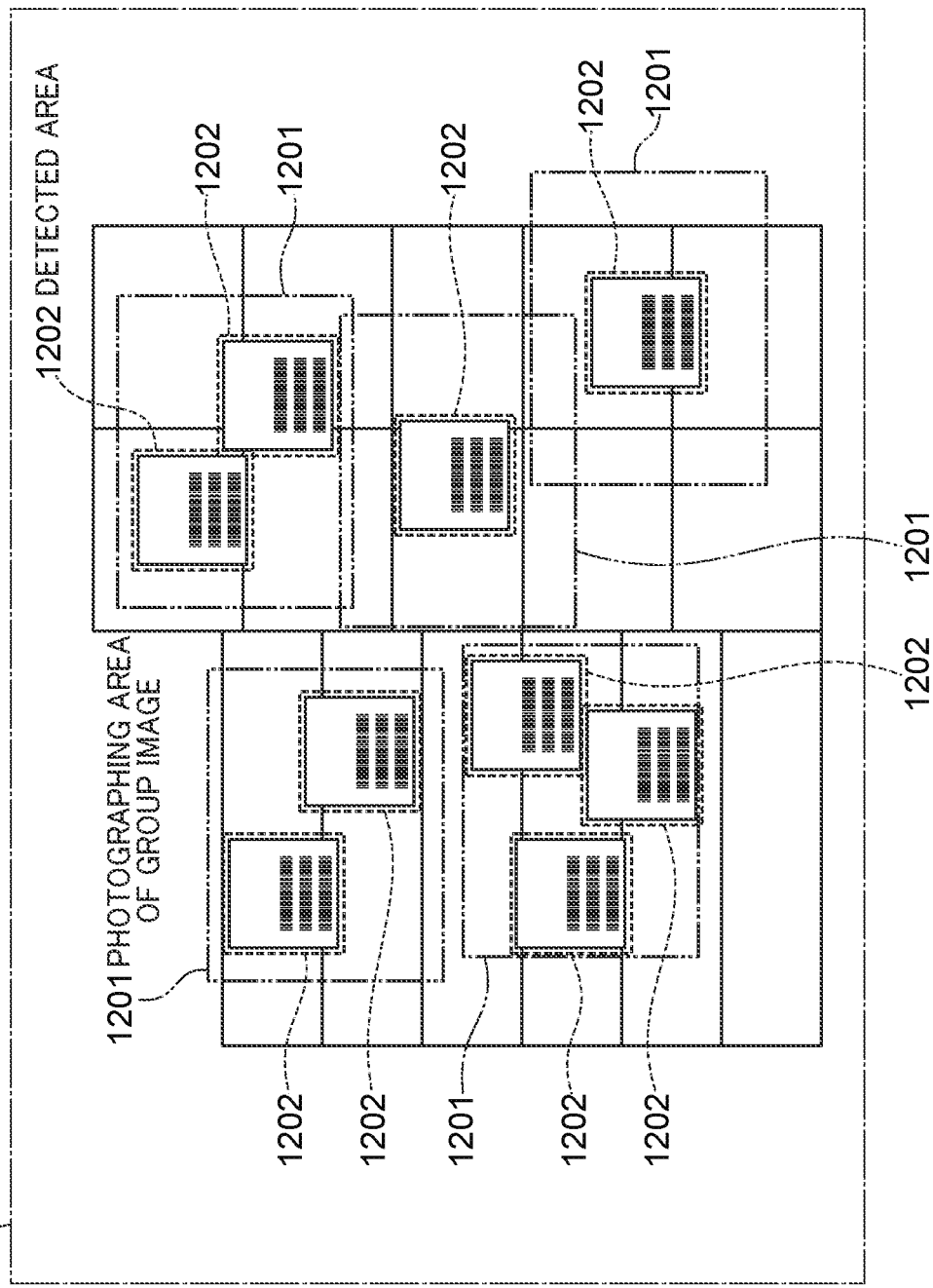
FIG. 12 is a diagram showing an example of grouping performed by the image processing apparatus of the image processing system according to the embodiment.

Referring to FIG. 12, a rectangle 1200 surrounded by one-dot chain lines is a rectangle representing an angle of view which is set for photographing the whole image in the step S600 of the preparation process, i.e. the rectangle 1200 represents the photographing area of the whole image. Further, in FIG. 12, each rectangle 1201 surrounded by two-dot chain lines is a rectangle representing an angle of view set for performing the zoom photographing at the zoom magnification (zoom magnification setting value) set in the step S606 of the preparation process, i.e. the rectangle 1201 represents the photographing area of the group image. The size of the grouping rectangle set in the step S1100 is the size of the rectangle 1201. In short, the rectangle 1201 is the grouping rectangle. Further, in FIG. 12, each rectangle 1202 surrounded by broken lines is a rectangle representing a tag area detected by the matching process in the step S1002, i.e. the rectangle 1202 represents a detected area detected by the matching process in the step S1002.

In a step S1101, the CPU 201 searches for a detected area to which a group number has not been assigned (hereinafter referred to as the "group number-unassigned detected area") and sets one of the group number-unassigned detected areas retrieved by the search as a target of the grouping process. The group number-unassigned detected area is hereinafter also referred to as the "ungrouped detected area". Further, a detected area to which a group number has been assigned (hereinafter simply referred to as the "group number-assigned detected area") is also referred to as the "grouped detected area".

Next, in a step S1102, the CPU 201 determines whether or not the grouping process has been performed on all detected areas detected by the matching process in the step S1002, i.e. determines whether or not all detected areas have been grouped. More specifically, in the step S1102, the CPU 201 executes the determination of whether or not a group number-unassigned detected area has been detected by the search performed in the step S1101. If it is determined in the step S1102 that a group number-unassigned detected area has been detected by the search performed in the step S1101, i.e. if it is determined that not all detected areas have been grouped, the CPU 201 proceeds to a step S1103. On the other hand, if it is determined in the step S1102 that no group number-unassigned detected area has been detected by the search performed in the step S1101, i.e. if it is determined that all detected areas have been grouped, the CPU 201 terminates the grouping process.

In the step S1103, the CPU 201 performs group number setting. More specifically, the CPU 201 sets a different group number for each loop of the grouping process. As the group number setting method, the initial number of the group number is set to 1, and the group number may be incremented whenever each loop of the grouping process is repeated. Alternatively, a unique group number, such as a GUID value, may be set whenever each loop of the grouping process is performed, so as to prevent duplication of the group number. Note that in the embodiment, as the group number setting method, the method is employed in which the initial number of the group number is set to 1 and the group number is incremented whenever each loop of the grouping process is repeated.

Next, in a step S1104, the CPU 201 performs a grouping search process for the target of the grouping process set in the step S1101 (i.e. one group number-unassigned detected area detected by the search in the step S1101). The grouping search process refers to processing for determining whether or not another detected area than the group number-unassigned detected area (detected area which has not been grouped) which is the target of the grouping process exists within a grouping rectangle, by sequentially moving the grouping rectangle such that each of the outer four corners of the group number-unassigned detected area is brought into contact with each of the inner four corners of the grouping rectangle.

Here, the grouping search process will be described in detail with reference to an example. FIGS. 13A to 13D show a specific example of the grouping search process. Referring to FIGS. 13A to 13D, a rectangle 1300 surrounded by broken lines is a rectangle representing the group number-unassigned detected area which is the target of the grouping process, and further, a rectangle 1301 surrounded by two-dot chain lines represents the grouping rectangle. The group number-unassigned detected area 1300 as the target of the grouping process is hereinafter simply referred to as the "detected area 1300".

Figure 13A:
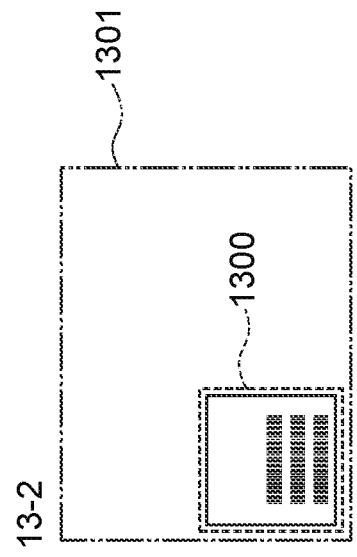
FIGS. 13A to 13D are diagrams showing an example of a grouping search process performed by the image processing apparatus in the image processing system according to the embodiment.
Figure 13B:
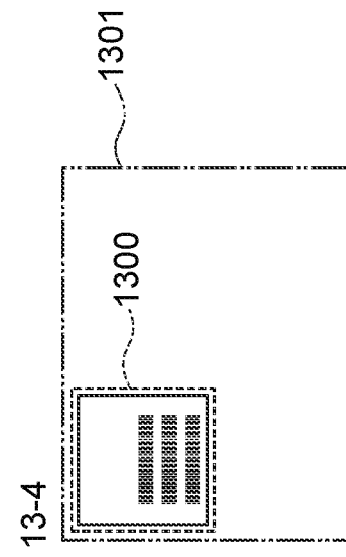
Figure 13C:
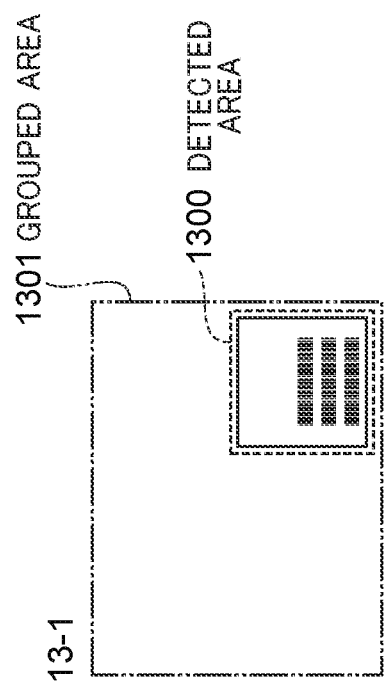
Figure 13D:
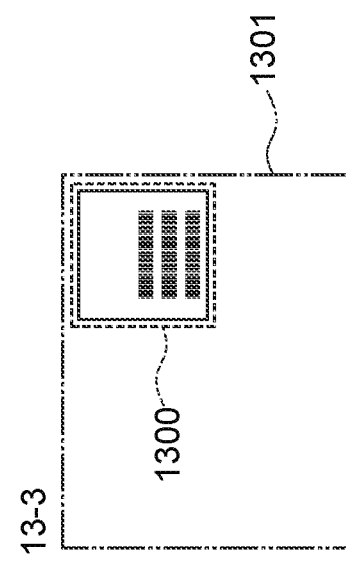

In the illustrated example denoted by reference numeral 13-1 in FIG. 13A, in a case where the grouping area 1301 is set such that a lower right inner corner of the grouping rectangle 1301 is brought into contact with a lower right outer corner of the detected area 1300, the CPU 201 determines that no other detected area exists within the grouping rectangle 1301. After the determination, similarly, while sequentially changing the position of the grouping rectangle 1301 such that each of the outer corners of the detected area 1300 brought into contact with an inner corner of the grouping rectangle 1301 is changed, as indicated by reference numeral 13-2 in FIG. 13B to reference numeral 13-4 in FIG. 13D, the number of detected areas within the grouping rectangle is counted and stored in the RAM 203. In each case of the illustrated examples in FIGS. 13A to 13D, the CPU 201 sets the number of detected areas in the grouping rectangle 1301 to 1 and stores the number in the RAM 203 in the step S1104.

An example denoted by reference numeral 14-1 in FIG. 14A and an example denoted by reference numeral 14-2 in FIG. 14B are specific examples of the grouping search process in a case where another detected area exists within the grouping rectangle. In the example denoted by the reference numeral 14-1 in FIG. 14, the grouping rectangle is moved such that the grouping rectangle is brought into contact with a detected area 14-1*a*, and in a case where the grouping rectangle is set to a position in which the grouping rectangle is in contact with the upper left corner of the detected area 14-1*a*, a detected area 14-1*b* exists within the set grouping rectangle. In the case of the example denoted by the reference numeral 14-1, the CPU 201 sets the number of detected areas in the grouping rectangle to 2 and stores the number in the RAM 203. In the example denoted by the reference numeral 14-2 in FIG. 14, the grouping rectangle is moved such that the grouping rectangle is brought into contact with a detected area 14-2*a*, and in a case where the grouping rectangle is set to a position in which the grouping rectangle is in contact with the upper left corner of the detected area 14-2*a*, detected areas 14-2*b* and 14-2*c* exist within the set grouping rectangle. In the case of the example denoted by the reference numeral 14-2, the CPU 201 sets the number of detected areas in the grouped area to 3 and stores the number in the RAM 203.

Next, in a step S1105, the CPU 201 determines a grouped area position. More specifically, the CPU 201 acquires the position of the grouping rectangle (center position) in which the number of existing detected areas is the largest of all the numbers sequentially acquired and stored in the RAM 203 by the process in the step S1104, and determines the acquired position of the grouping rectangle as the grouped area position.

Next, in a step S1106, the CPU 201 assigns a group number to each of the detected areas in the grouped area. More specifically, in the step S1106, the CPU 201 assigns the same group number to all detected areas included in the grouped area in the grouped area position determined in the step S1105.

Next, in a step S1107, the CPU 201 performs a group number duplication deletion process, and then proceeds to a step S1108. The group number duplication deletion process is a process for deleting a duplicated group number in a case where a group number has already been assigned to a detected area as a target to which a group number is about to be assigned in the step S1106. More specifically, in the group number duplication deletion process, only in a case where the number of detected areas including the detected area as the target in a group having a group number which is to be newly assigned is larger than the number of detected areas including the detected area as the target in a group having a group number which has already been assigned, the group number of the group having a smaller number of detected areas is deleted from the detected area as the target and the group number assigned to the detected area as the target is updated to the group number of the group having a larger number of detected areas. Therefore, the group number duplication deletion process can also be referred to as the group number updating process. Note that the number of detected areas in a group having a group number is the number of detected areas having the group number within the grouped area, and means the number of detected areas to which the group number is assigned.

Here, the group number duplication deletion process (group number updating process) will be described in detail with reference to a specific example (the example denoted by reference numeral 14-3 in FIG. 14C and the example denoted by reference numeral 14-4 in FIG. 14D).

First, in the example denoted by the reference numeral 14-3, in a case where the grouping process is performed for a detected area 14-3*a*, a group including a detected area 14-3*b* (grouped area) is generated, and the detected areas 14-3*a* and 14-3*b* belong to the same group. After that, in a case where the grouping process is performed for a detected area 14-3*c*, a group including the detected area 14-3*b* (grouped area) is generated, and the detected areas 14-3*c* and 14-3*b* belong to the same group. Although the group number has already been assigned to the detected area 14-3*b* in the preceding grouping process, the number of detected areas in the group is equal to that of detected areas in the group generated in a subsequent grouping process, and hence the group number of the detected area 14-3b is not updated.

Next, in the example denoted by the reference numeral 14-4 in FIG. 14D, in a case where the grouping process is performed for a detected area 14-4a, a group also including a detected area 14-4c (grouped area) is generated, and the detected areas 14-3a and 14-3c belong to the same group. After that, in a case where the grouping process is performed for a detected area 14-4b, a group also including the detected areas 14-4c and a detected area 14-4d (grouped area) is generated, and the detected areas 14-4b, 14-4c and 14-4d belong to the same group. Although the group number has already been assigned to the detected area 14-4c in the preceding grouping process, the number of detected areas in the group is larger than that of detected areas in the group generated in a subsequent grouping process, and hence the group number of the detected area 14-4c is updated to a new group number.

Then, in the step S1108, the CPU 201 performs a grouped area position correction process on groups (grouped areas) generated in the process from the step S1103 to the step S1107. The grouped area position correction process is processing for correcting the position of a grouped area determined in the step S1105 such that the center of grouped detected areas and the center of the grouped area coincide with each other.

Here, the grouped area position correction process will be described in detail with reference to a specific example. First, the grouped area position correction process performed in a case where only one grouped detected area exists in a grouped area will be described with reference to an example denoted by reference numeral 15-1 in FIG. 15A.

Figure 15A:
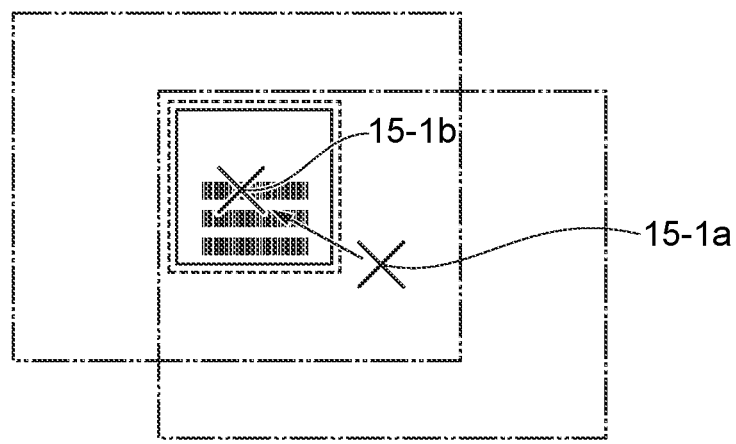
FIGS. 15A and 15B are diagrams showing an example of grouped area position correction performed by the image processing apparatus of the image processing system according to the embodiment.

In the example denoted by the reference numeral 15-1 in FIG. 15A, although the grouped area position (the center position of the grouped area) determined in the step S1105 is a position indicated by 15-1a, the center position of the grouped area is corrected to a position indicated by 15-1b which is the position of the center of the one grouped detected area by the grouped area position correction process.

Figure 15B:
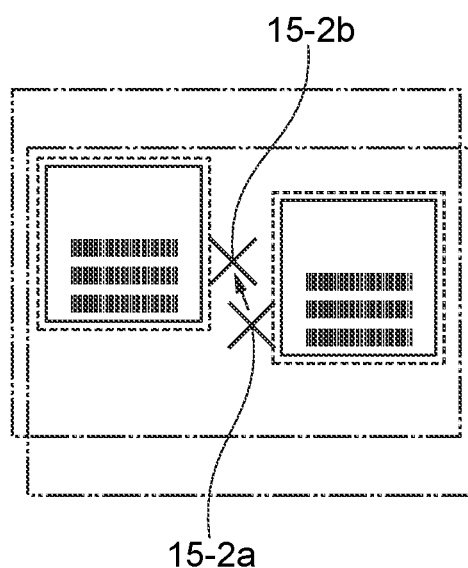

Next, the grouped area position correction process performed in a case where a plurality of grouped detected areas exist in a grouped area will be described with reference to an example denoted by reference numeral 15-2 in FIG. 15B (example in which two grouped detected areas exist in the grouped area).

In the example denoted by the reference numeral 15-2, although the grouped area position (the center position of the grouped area) determined in the step S1105 is a position indicated by 15-2a, the grouped area position is corrected to a position indicated by 15-2b which is the position of the center of the two grouped detected areas by the grouped area position correction process.

In the step S1108, the CPU 201 stores the grouped area position corrected by the grouped area position correction process (hereinafter referred to as the "corrected grouped area position") in the RAM 203. That is, in the example denoted by the reference numeral 15-1 in FIG. 15A, the position indicated by 15-1b is stored in the RAM 203 as the corrected grouped area position. Further, in the example denoted by the reference numeral 15-2 in FIG. 15B, the position indicated by 15-2b is stored in the RAM 203 as the corrected grouped area position.

Then, after storing the corrected grouped area position in the RAM 203 in the step S1108, the CPU 201 returns to the step S1101 and searches for a group number-unassigned detected area. As described above, in the step S1102, if it is determined that all of the detected areas have been grouped, the CPU 201 terminates the grouping process.

As described above, the grouping process is a process for making it possible to perform arrival inspection, by the number of times of PTZ photographing operations smaller than the number of tags attached to all packages of the cargo B. In the image processing system according to the embodiment, since the PTZ photographing is performed only for the grouped area obtained by the grouping process performed by the CPU 201 of the image processing apparatus 100, the whole operation time of the arrival inspection is reduced. That is, according to the image processing system according to the embodiment, it is possible to perform the arrival inspection of a number of packages corresponding to the number of detected areas, only by performing PTZ photographing the number of times corresponding to the number of grouped areas which is smaller than the number of detected areas.

Figure 16:
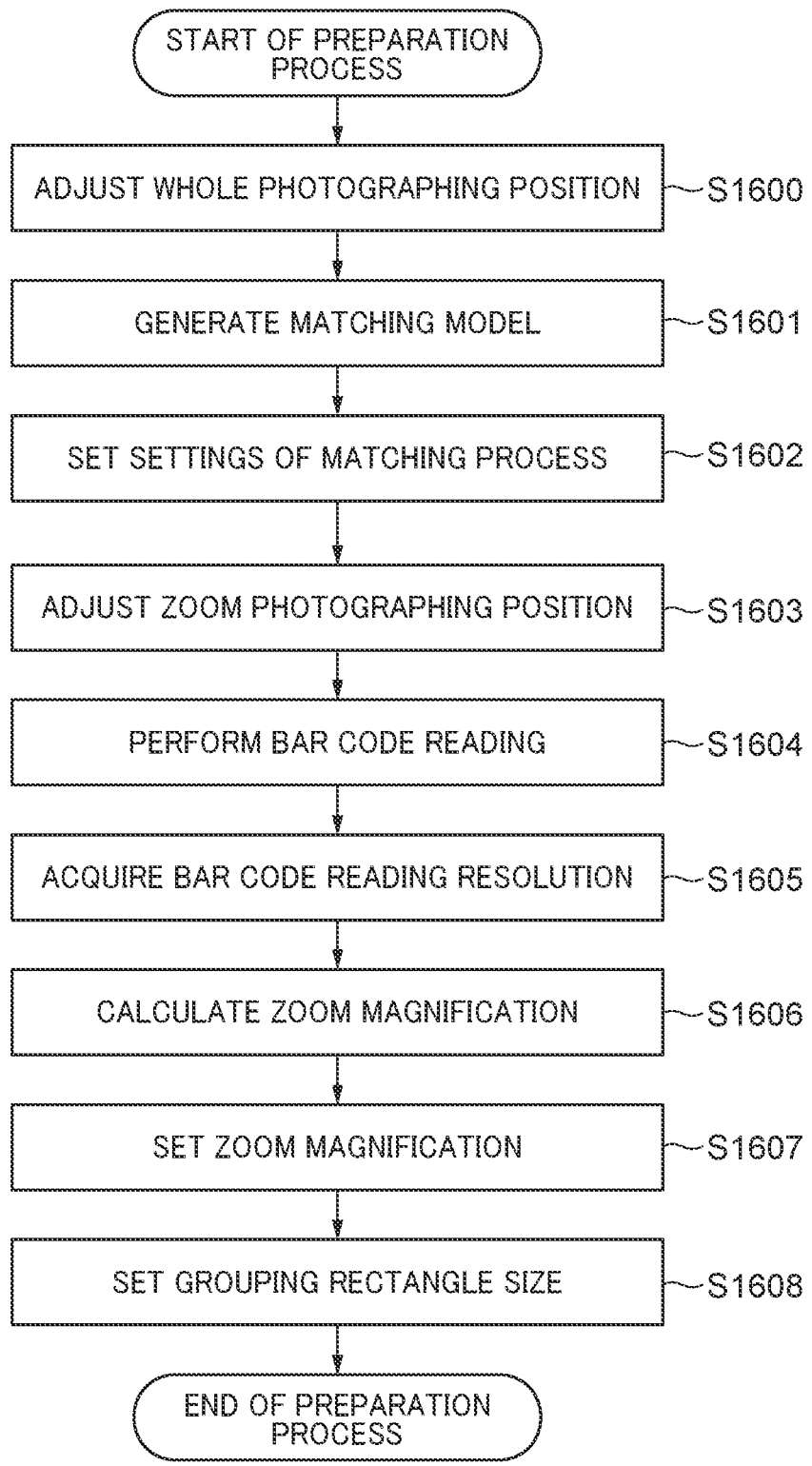
FIG. 16 is a flowchart of a variation of the preparation process performed by the image processing apparatus of the image processing system according to the embodiment.

Hereafter, a variation of the preparation process performed by the image processing apparatus 100 of the image processing system according to the embodiment will be described. FIG. 16 is a flowchart of the variation of the preparation process performed by the image processing apparatus 100.

First, steps S1600, S1601, and S1602 are the same as the steps S600, S601, and S602 in FIG. 6, and hence description thereof is omitted.

Next, in a step S1603, the CPU 201 as zoom photographing position-adjusting means performs processing for adjusting the zoom photographing position in the matching test screen 900. More specifically, when it is detected that the test execution button 905 is pressed by the user in a state in which the zoom photographing position and the zoom magnification have been set, the CPU 201 generates control commands according to the settings and transmits the generated control commands to the NW camera 110. Upon receipt of the control commands from the image processing apparatus 100, the NW camera 110 acquires a zoom image, by performing panning, tilting, and zooming according to the settings indicated by the received control commands and performing photographing processing, and transmits the acquired zoom image to the image processing apparatus 100.

Next, in a step S1604, the CPU 201 performs the bar code reading on the received zoom image and displays a result of the bar code reading (i.e., a type of the bar code) in the display area 901.

Next, in a step S1605, the CPU 201 acquires a resolution required to read the bar code (hereinafter simply referred to as the "bar code reading resolution"). More specifically, in the step S1605, the CPU 201 acquires the bar code reading resolution by checking the type of the bar code obtained in the step S1604 against map data of the bar code reading resolution (i.e. required resolution) associated with the bar code type. The map data of the required resolution associated with the bar code type is e.g. in the form of a table shown in FIG. 17 and is stored in the HDD 205 in advance. Note that the map data of required resolutions associated with respective bar code types may be stored in a storage section other than the HDD 205 (such as the DB 120 used for the arrival inspection processing). Further, as the method of setting the map data, the map data stored in the HDD 205 may be read out and set by the CPU 201. The map data stored in a storage section other than the HDD 205 (such as the DB 120 used for the arrival inspection processing) may be read out and set by the CPU 201. Further, the CPU 201 may set the map data according to a user operation.

Next, in a step S1606, the CPU 201 calculates a zoom magnification required to read the bar code (hereinafter simply referred to as the "bar code reading zoom magnification"). More specifically, in the step S1606, the CPU 201 calculates the bar code reading zoom magnification based on the bar code reading resolution acquired in the step S1605 and the bar code type acquired in the step S1604, and stores the calculated bar code reading zoom magnification in the HDD 205. For example, the bar code reading zoom magnification may be calculated by referring to the map data of the bar code reading zoom magnification associated with the bar code type and the bar code reading resolution, set by a user operation.

Next, in a step S1607, the CPU 201 as the zoom magnification-setting unit sets the zoom magnification. More specifically, in the step S1607, the CPU 201 sets the bar code reading zoom magnification calculated and stored in the HDD 205 in the step S1606, as the zoom magnification, and then proceeds to a step S1608.

The step S1608 is the same as the step S607 in FIG. 6, and hence description thereof is omitted.

In the step S1606, the CPU 201 may use the following calculation method when calculating the bar code reading zoom magnification.

In a case where the whole image photographing zoom magnification is onefold, the magnification setting value at the zoom photographing position (the zoom magnification setting value) set in the step S1603 is fourfold, the bar code type is a bar code type (1), and the width of the bar code is 400 pix, the bar code reading zoom magnification is calculated as follows:

In the above-described example, the bar code type (1) can be read with a width of 300 pix, and hence the zoom magnification is a set value of ¾, that is, it is possible to read the bar code even when the zoom magnification is threefold.

Note that the image processing apparatus 100 may perform the preparation process in FIG. 6 or may perform the preparation process in FIG. 16.

Other Embodiments

Embodiment(s) of the disclosure can also be realized by a computer of a system or equipment that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or equipment by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2021-084732 filed May 19, 2021, which is hereby incorporated by reference herein in its entirety.

What is claimed is:

1. An image processing apparatus comprising:
a processor; and
a memory storing a program which, when executed by the processor, causes the image processing apparatus to:
communicate with an image capture device having panning, tilting, and zooming functions;
detect a code area by performing a matching process on a whole object image area which is acquired by photographing an area including a whole predetermined object on which codes are attached, by the image capture device, and includes codes to be read;
set a zoom magnification setting value;
generate grouped areas by grouping a plurality of the detected code areas, based on an angle of view to be set when performing photographing with zooming at the set zoom magnification setting value;
control the image capture device to perform panning, tilting, and zooming operations, such that the generated grouped areas are sequentially photographed at the zoom magnification setting value;
set an image processing area with respect to a group image obtained by performing the panning, tilting, and zooming operations and photographing each of the generated grouped areas by controlling the image capture device; and
perform code reading for reading information on each code area included in the set image processing area.

2. The image processing apparatus according to claim 1, wherein the panning, tilting, zooming operations of the image capture device is controlled such that, after the grouped area is generated, the center position of the grouped area coincides with the center of an angle of view of photographing with zooming at the set zoom magnification setting value.

3. The image processing apparatus according to claim 1, wherein the size of the group image is determined based on the zoom magnification setting value and the size of the whole object image area.

4. The image processing apparatus according to claim 1, wherein the code reading is performed, on a zoom image which includes a code to be read and is acquired by photographing with zooming at the set zoom magnification setting value by the image capture device,
wherein the program when executed by the processor further causes the image processing apparatus to:
determine whether or not the code has been normally read, according to a user operation,
set, in a case where the code has been normally read as a result of the determination, the current zoom magnification as a zoom magnification at which the code has been normally read, and then reduce the current zoom magnification, and repeatedly execute the photographing with zooming at a the reduced zoom magnification, the code reading, and the determination, and wherein in a case where the code has not been normally read as a result of the determination, a last zoom magnification is set at which the code has been normally read, as the zoom magnification setting value.

5. The image processing apparatus according to claim 1, wherein the zoom magnification setting value is calculated based on a code reading resolution corresponding to a type of code.

6. The image processing apparatus according to claim 5, wherein map data of the code reading resolution associated with the type of the code is set by a user operation.

7. The image processing apparatus according to claim 5, wherein map data of the code reading zoom magnification associated with the type of the code and the code reading resolution is set by a user operation.

8. A method of controlling an image processing apparatus, comprising:

communicating with an image capture device having panning, tilting, and zooming functions;

detecting a code area by performing a matching process on a whole object image area which is acquired by photographing an area including a whole predetermined object on which codes are attached, by the image capture device, and includes codes to be read;

setting a zoom magnification setting value;

generating grouped areas by grouping a plurality of the detected code areas, based on an angle of view to be set when performing photographing with zooming at the set zoom magnification setting value;

controlling the image capture device to perform panning, tilting, and zooming operations, such that the generated grouped areas are sequentially photographed at the zoom magnification setting value;

setting an image processing area with respect to a group image obtained by performing the panning, tilting, and zooming operations and photographing each of the generated grouped areas by controlling the image capture device; and performing code reading for reading information on each code area included in the set image processing area.

9. The method according to claim 8, wherein the panning, tilting, zooming operations of the image capture device is controlled such that, after the grouped area is generated, the center position of the grouped area coincides with the center of an angle of view of photographing with zooming at the set zoom magnification setting value.

10. The method according to claim 8, wherein the size of the group image is determined based on the zoom magnification setting value and the size of the whole object image area.

11. The method according to claim 8, wherein the code reading is performed, on a zoom image which includes a code to be read and is acquired by photographing with zooming at the set zoom magnification setting value by the image capture device, the method further comprising:

determining whether or not the code has been normally read, according to a user operation, setting, in a case where the code has been normally read as a result of the determination, the current zoom magnification as a zoom magnification at which the code has been normally read, and then reducing the current zoom magnification, and repeatedly executing the photographing with zooming at a the reduced zoom magnification, the code reading, and the determination, and wherein in a case where the code has not been normally read as a result of the determination, a last zoom magnification is set at which the code has been normally read, as the zoom magnification setting value.

12. The method according to claim 8, wherein the zoom magnification setting value is calculated based on a code reading resolution corresponding to a type of code.

13. The method according to claim 12, wherein map data of the code reading resolution associated with the type of the code is set by a user operation.

14. The method according to claim 12, wherein map data of the code reading zoom magnification associated with the type of the code and the code reading resolution is set by a user operation.

15. A non-transitory computer-readable storage medium storing a program for causing a computer to execute a method of controlling an image processing apparatus, wherein the method comprises:

communicating with an image capture device having panning, tilting, and zooming functions;

detecting a code area by performing a matching process on a whole object image area which is acquired by photographing an area including a whole predetermined object on which codes are attached, by the image capture device, and includes codes to be read;

setting a zoom magnification setting value;

generating grouped areas by grouping a plurality of the detected code areas, based on an angle of view to be set when performing photographing with zooming at the set zoom magnification setting value;

controlling the image capture device to perform panning, tilting, and zooming operations, such that the generated grouped areas are sequentially photographed at the zoom magnification setting value;

setting an image processing area with respect to a group image obtained by performing the panning, tilting, and zooming operations and photographing each of the generated grouped areas by controlling the image capture device; and performing code reading for reading information on each code area included in the set image processing area.

* * * * *